United States Patent
Wang et al.

(10) Patent No.: US 7,512,713 B2
(45) Date of Patent: Mar. 31, 2009

(54) SYSTEM AND METHOD FOR RENDERING INDEPENDENT PERSISTENCE OF INFORMATION BY PERFORMING A TIME DRIVEN QUERY ON AN AGGREGATED SCHEMATIZED QUERYABLE REPORT

(75) Inventors: Fang Wang, Bellevue, WA (US); Yee Man Bergstrom, Kirkland, WA (US); Jason Carlson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 10/404,746

(22) Filed: Mar. 31, 2003

(65) Prior Publication Data

US 2005/0278615 A1 Dec. 15, 2005

(51) Int. Cl.
*G06F 15/16* (2006.01)
(52) U.S. Cl. .................. 709/246; 709/203; 715/209; 715/234; 707/4; 707/101
(58) Field of Classification Search ................. 709/203, 709/246, 201; 715/513, 523, 746, 209, 234, 715/254; 707/1, 3, 4, 101, 104.1, E17.006
See application file for complete search history.

(56) References Cited

U.S. PATENT DOCUMENTS

| | | | |
|---|---|---|---|
| 5,864,870 A | 1/1999 | Guck et al. ................. 707/104 |
| 6,160,549 A * | 12/2000 | Touma et al. ............... 715/762 |
| 6,502,237 B1 * | 12/2002 | Yates et al. ................. 717/136 |
| 6,571,140 B1 * | 5/2003 | Wewalaarachchi et al. .... 700/83 |
| 6,725,426 B1 * | 4/2004 | Pavlov ....................... 715/523 |
| 6,779,154 B1 * | 8/2004 | Nussbaum et al. .......... 715/523 |
| 6,810,429 B1 * | 10/2004 | Walsh et al. ................. 709/246 |
| 6,922,725 B2 * | 7/2005 | Lamming et al. ........... 709/227 |
| 6,988,109 B2 * | 1/2006 | Stanley et al. ............. 707/103 Y |
| 6,996,568 B1 * | 2/2006 | Bedell et al. ................. 707/100 |
| 7,053,958 B2 * | 5/2006 | Collins et al. ............... 348/573 |
| 7,331,015 B2 * | 2/2008 | Hays et al. ................... 715/248 |
| 2002/0087571 A1 | 7/2002 | Stapel et al. |
| 2002/0143521 A1 * | 10/2002 | Call .............................. 704/1 |
| 2002/0143824 A1 | 10/2002 | Lee Kwok et al. .......... 707/523 |
| 2003/0046317 A1 * | 3/2003 | Cseri et al. .................. 707/513 |

(Continued)

FOREIGN PATENT DOCUMENTS

EP 1 122 652 A1 8/2001

(Continued)

OTHER PUBLICATIONS

Martin, B. et al., "WAP Binary XML Content Format", W3C NOTE Jun. 24, 1999, http://www.w3.org/1999/06/NOTE-wbxml-19990624.*

(Continued)

*Primary Examiner*—Oanh Duong
(74) *Attorney, Agent, or Firm*—Woodcock Washburn LLP

(57) ABSTRACT

A system and methods providing a rendering independent persistence of information is provided. In an illustrative implementation, data is provided having some predefined structure. In operation, the data is processed such that the data and it's associated structure are represented in a data format that is persistent. In operation, the data is parsed according to one or more constraints and translated into the persistent data format.

11 Claims, 10 Drawing Sheets

U.S. PATENT DOCUMENTS

| | | | |
|---|---|---|---|
| 2003/0046670 A1* | 3/2003 | Marlow | 717/140 |
| 2003/0051033 A1* | 3/2003 | Kusumoto et al. | 709/224 |
| 2003/0066084 A1* | 4/2003 | Kaars | 725/89 |
| 2003/0097247 A1* | 5/2003 | Bond et al. | 703/23 |
| 2003/0179315 A1* | 9/2003 | Collins et al. | 348/441 |
| 2003/0204495 A1* | 10/2003 | Lehnert | 707/3 |
| 2003/0208460 A1* | 11/2003 | Srikant et al. | 707/1 |
| 2004/0002884 A1* | 1/2004 | Lenio | 705/8 |
| 2004/0002982 A1* | 1/2004 | Ersek et al. | 707/100 |
| 2004/0103084 A1* | 5/2004 | Megerian | 707/3 |
| 2004/0168115 A1* | 8/2004 | Bauernschmidt et al. | 715/500 |

FOREIGN PATENT DOCUMENTS

| | | | |
|---|---|---|---|
| WO | WO 02/29560 A1 | 4/2002 | |
| WO | WO 02/059773 A1 | 8/2002 | |

OTHER PUBLICATIONS

Henschen, D., "The Market Embraces ECM", *Transform Magazine*, 2003, 12(1), 35-36.

Rofrano, J.J. et al., "IBM WebSphere Commerce Suite Product Advisor", *IBM Systems Journal*, 2001, 40(1), 91-103.

Takanashi, I. et al., "ISpace: Interactive Volume Data Classification Techniques Using Independent Component Analysis", *Proceedings of the 10th Pacific Conference on Computer Graphics and Applications*, 2002, 366-374.

Xin, T., et al., "Efficiently Rendering Large Volume Data Using Texture Mapping Hardware", *Journal of Tsinghua University (Science and Technology)*, 2000, 40(1), 72-75 (English Language Abstract).

Xu, P. et al., "XML-Based Data Rendering Engine for Content Management System", *Advances in Web-Age Information Management. Third International Conference, WAIM*, 2002, (Lecture Notes in Computer Science vol. 2419), 170-180.

* cited by examiner

SYSTEM AND METHOD FOR RENDERING INDEPENDENT PERSISTENCE OF INFORMATION BY PERFORMING A TIME DRIVEN QUERY ON AN AGGREGATED SCHEMATIZED QUERYABLE REPORT

FIELD OF THE INVENTION

The present invention relates generally to the field of data rendering, and, more particularly, to novel expression of a data in a rendering independent persistent data format that is more easily usable by a variety of cooperating computing applications and computing environments.

BACKGROUND OF THE INVENTION

Data storage and format is ubiquitous with data management and data processing. In the context of computing applications, data is the lifeline. From simple content based data to complex embedded instruction sets, data acts as the input to most computing applications and is the resultant output of these computing applications. Not surprisingly, computing application designers and developers have developed staggering amounts of computing applications to create, manage, store, and process data that touches each of us in almost every aspect of our lives. From simple word processing applications to complicated encryption techniques for use in communicating sensitive data, data processing computing applications have become integrated within daily routines and practices. The development of the myriad of data operative computing applications has rendered an expected byproduct—simply a number of varying and disparate data formats and types.

With disparate data formats, it becomes increasingly difficult to share data between cooperating computing applications and computing environments that have their own native data formats and definitions. Addressing these concerns, computing application developers have developed and implemented various data filters and translators that allow them to accept non-native data formats. However, the integration and implementation of such data conversion mechanisms comes at an expense, namely, increased processing requirements and the loss of data integrity. Moreover, data conversion may not be available to each and every computing application seeking to process non-native data. As such, sharing desired data among cooperating computing applications is rendered difficult at best.

Data may be characterized by a rendering extension which is representative of the underlying format and/or layout. The rendering extension prompts cooperating applications of the data format and/or layout and, if appropriate, will trigger the conversion of data by the cooperating computing application to a native format native to the requesting cooperating computing application. The rendering extensions, generally, also provide an indication of which computing application or computing environment generated a piece or set of data. For example if a particular word processor computing application generated a data (e.g. a document), the rendering extension may be of the ".doc" variety. Comparatively, if a spreadsheet computing application generated some data (e.g. a spreadsheet, graph, etc.), then the rendering extension may be ".xls".

Currently, computing applications generally generate data (e.g. reports) having a single rendering extension (e.g. html, .doc, .xls, .xml) definition that is usually native to the computing application that is generating the data. As such, cooperating applications, when processing reports, first are required to perform a translation of the foreign rendering extension to a native rendering extension. This translation step, in some instances, can introduce errors, that is, data layout/formatting error and, more importantly, data error. Moreover, the data, in such form, has limited utility to cooperating applications as the generated report is not easily queryable. In most instances, participating users will use the computing applications to generate new data having new report definitions instead of trying to reuse an already generated report.

Another drawback of existing practices is an inability to perform a time driven analysis of already generated data. As described, a computing application may operate on one or more cooperating data stores. These data stores have various tables having various field definitions. Over time the value of the fields will change to reflect one or more change in the organization and/or enterprise operating the data store. For example, a car dealership may employ a computing application cooperating with a data store to record sales. The sales values would change as more cars are sold. In the same example, the computing application may operate to generate a report to show the total sales by each of the sales staff of the car dealership. Once again with increasing sales, the report values change. Current data (e.g. report) generating computing applications operate such to gather the necessary data according to a definition and generate a data work product according to the report definition. However, the data work product acts a snapshot of the values of the data fields found in the cooperating data store at the time of the data work product generation.

Moreover, current computing applications would expose the generated data work product as data construct that is probably not schematized, not stored in a non-persistent data format, and thus is not easily queryable. As such, these applications would not be able to support a time-dimensioned query on the historical data work products to provide a time-driven analysis of one or more of the data values. By storing data in a non-persistent rendering dependent format, current applications are incapable of performing a time driven analysis that may be used to determine trends.

Rendering independent persistent data formats have many application outside of the report generation and management context. For example, a rendering independent persistent data format may be incorporated to communicate a variety of data, such as web content, across disparate computing application having their own native rendering requirements and standards.

From the foregoing it is appreciated that there exists a need for systems and methods that provides data in a rendering independent persistent format for use in a variety of processing that is not realized by current practices. By having these systems and methods the prior art is overcome.

SUMMARY OF THE INVENTION

The present invention provides systems and methods to represent data as a rendering independent persistence of information. In an illustrative implementation, data having a predefined structure is provided. The data is processed such that a representation of the data is created wherein the representation includes information about the data and the data's structure.

In operation, the data is parsed and converted to a predefined format that is persistent. In a contemplated implementation, a generated data set is provided by the computing application in a rendering independent persistent data format. The rendering independent persistent data format, inter alia, allows for the application to perform time lapsed and time driven queries on the report exposed as schematized queryable data source, and more importantly, allows the report to be perceived as any other data source by other cooperating computing applications.

Other features and aspects of the herein described systems and methods are described in more detail below.

DETAILED DESCRIPTION OF ILLUSTRATIVE IMPLEMENTATIONS

Overview:

The persistence of data is tantamount to effective data warehousing and data processing. Currently, computing applications and computing environments operate on data to generate one or more data work products that can be described by one or more rendering extensions. The rendering extension, generally, may be used to characterize the format and definition of the data found in data work products. Typically, a computing application will operate on a set of data in a data processing mode to generate data work products having a particular rendering extension. For example, a word processing computing application may operate on text type data to generate formatted documents. Such formatted documents may then be stored as data having the ".doc" rendering type.

A problem arises however when cooperating computing applications and computing environments vie for data that has a non-native data format or definition (i.e. stored and exposed having different and varying rendering extensions). Typically, the computing applications, if equipped, will call upon one or more data conversion operations to translate the desired data work product into a native rendering extension. However, such conversion can be processing intensive and can introduce significant error into the final data work product.

The present invention aims to ameliorate the shortcomings of existing practices by providing a system and methods that expose data having a rendering independent persistent data format. Specifically, an exemplary computing application is provided that operates on data according to a predetermined definition. The data definition contains, inter alia, information relevant to the desired data to be provided, data layout information, and data formatting information. The exemplary computing application retrieves the desired data and data definition from the cooperating data store. Once gathered, the exemplary computing application defines a schema for the data and stores the data in an intermediate data format. The intermediate data format is a rendering independent persistent data format. As such, the retrieved data having an associated schema is exposed as a data source with all of the benefits a data source provides to cooperating applications. Moreover, being stored as a rendering independent persistent data format, current reusability (i.e. usability between disparate computing applications and computing environments having varying data rendering extension requirements) issues are resolve, as well as, with the present system and methods, time driven queries are more easily executable against a set of generated reports.

It is appreciated that although the herein described systems and methods are described in the context of the generation of one or more data work products, that the rendering independent persistence of information may be utilized in various ways that go beyond the scope of the provided examples.

A. Exemplary Computing Environment

Figure 1:
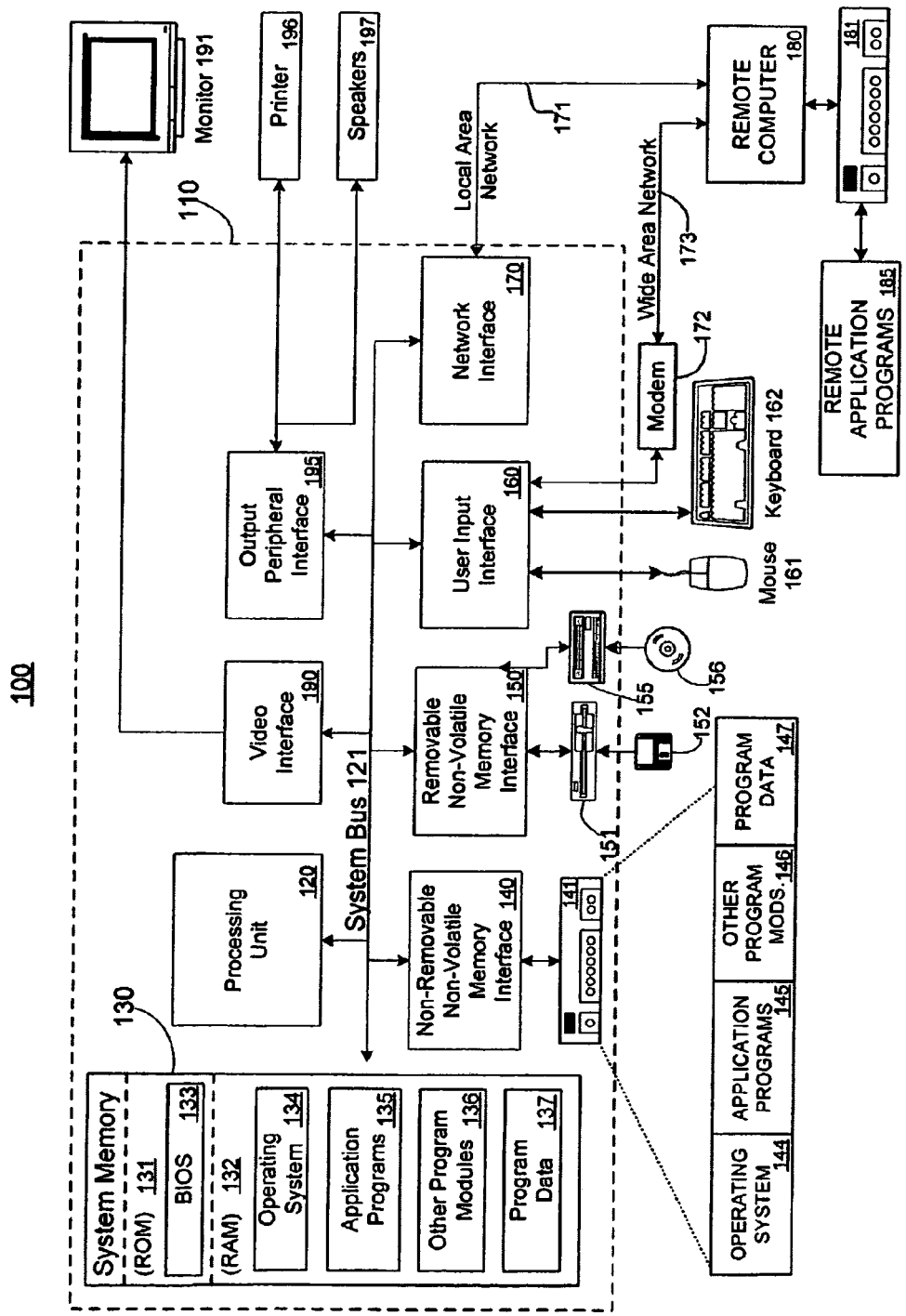
FIGS. 1 and 2 are schematic illustrations of exemplary computing environments suitable for the present invention, with FIG. 2 depicting an exemplary networked computing environment.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network, PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

B. Exemplary Networked Computing Environment

Figure 2:
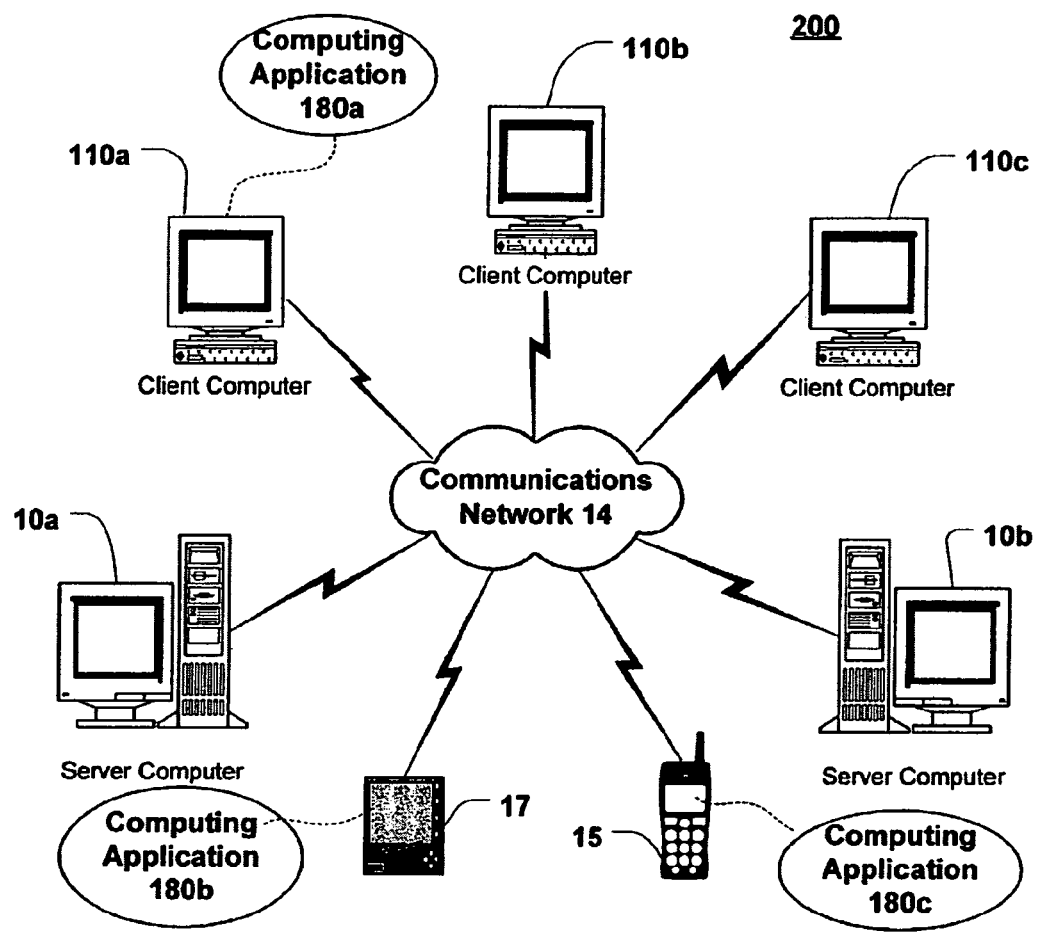

Computer 110, described above, can be deployed as part of a computer network. In general, the above description for computers applies to both server computers and client computers deployed in a network environment. FIG. 2 illustrates an exemplary network environment, with a server in communication with client computers via a network, in which the present invention may be employed. As shown in FIG. 2, a number of servers 10a, 10b, etc., are interconnected via a communications network 160 (which may be a LAN, WAN, intranet, the Internet, or other computer network) with a number of client computers 110a, 110b, 110c, or computing devices, such as, mobile phone 15, land-line telephone, and personal digital assistant 17. In a network environment in which the communications network 160 is the Internet, for example, the servers 10 can be Web servers with which the clients 110 communicate via any of a number of known protocols, such as, hypertext transfer protocol (HTTP) or wireless application protocol (WAP). Each client computer 20 can be equipped with browser 180a to gain access to the servers 10. Similarly, personal digital assistant 17 can be equipped with browser 180b and mobile phone 15 can be equipped with browser 180c to display and receive various data.

In operation, a user (not shown) may interact with a computing application running on a client computing devices to expose a report as a schematized queryable data source. The reports may be stored on server computers and communicated to cooperating users through client computing devices over communications network 160. A user may generate, manage, and interact with such reports by interfacing with computing applications on client computing devices. These transactions may be communicated by client computing devices to server computers for processing and storage. Server computers may host computing applications to expose reports as queryable schematized data sources.

Thus, the present invention can be utilized in a computer network environment having client computing devices for accessing and interacting with the network and a server computer for interacting with client computers. However, the systems and methods described herein can be implemented with a variety of network-based architectures, and thus should not be limited to the example shown. The herein described systems and methods will now be described in more detail with reference to a presently illustrative implementation.

C. Reports As Data Sources

Figure 3:
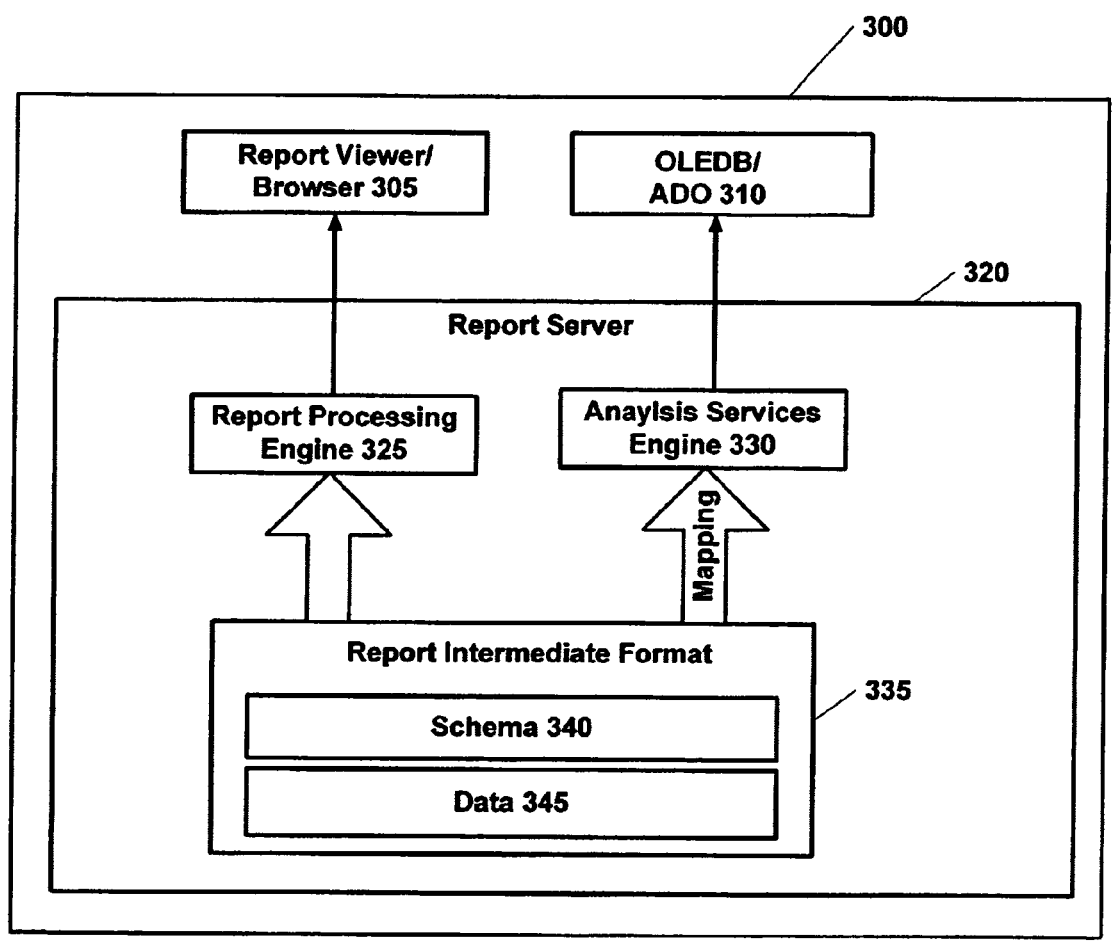
FIG. 3 is a block diagram of showing an exemplary implementation of a report as a data source in accordance with the herein described system and methods.

FIG. 3 shows a block diagram of an exemplary illustrative architecture of an exemplary report generation and management system that exposes a report. A shown, the exemplary architecture 300 comprises report server 320. Report server 320 further comprises report processing engine 325, analysis services engine 330, and report intermediate format 335. The report intermediate format 335 further comprises data 345 and schema 340. Lastly, exemplary architecture 400 comprises report viewer/browser 305 and OLEDB/ADO 310. In operation, report server 320 generates schema 340 that operates on report data 345. The report server 320 generates report intermediate format which is a schematized queryable data source having a rendering independent persisted data format. The intermediate data format can then be used by report server 320 to display the generated report via 305. In this context, the intermediate format 335 is processed by the report processing engine 325 of the report server 320 to display the report on report viewer/browser 305. The intermediate format can also be used by report server 320 to communicate the generated report to cooperating environments via analysis services engine 330 using OLEDB module 310.

By having the report in an intermediate format that is schematized, the report looks like and acts like a data source to cooperating environments and cooperating computing applications.

D. Exposing Data Work Products as Schematized Data Sources

Figure 4:
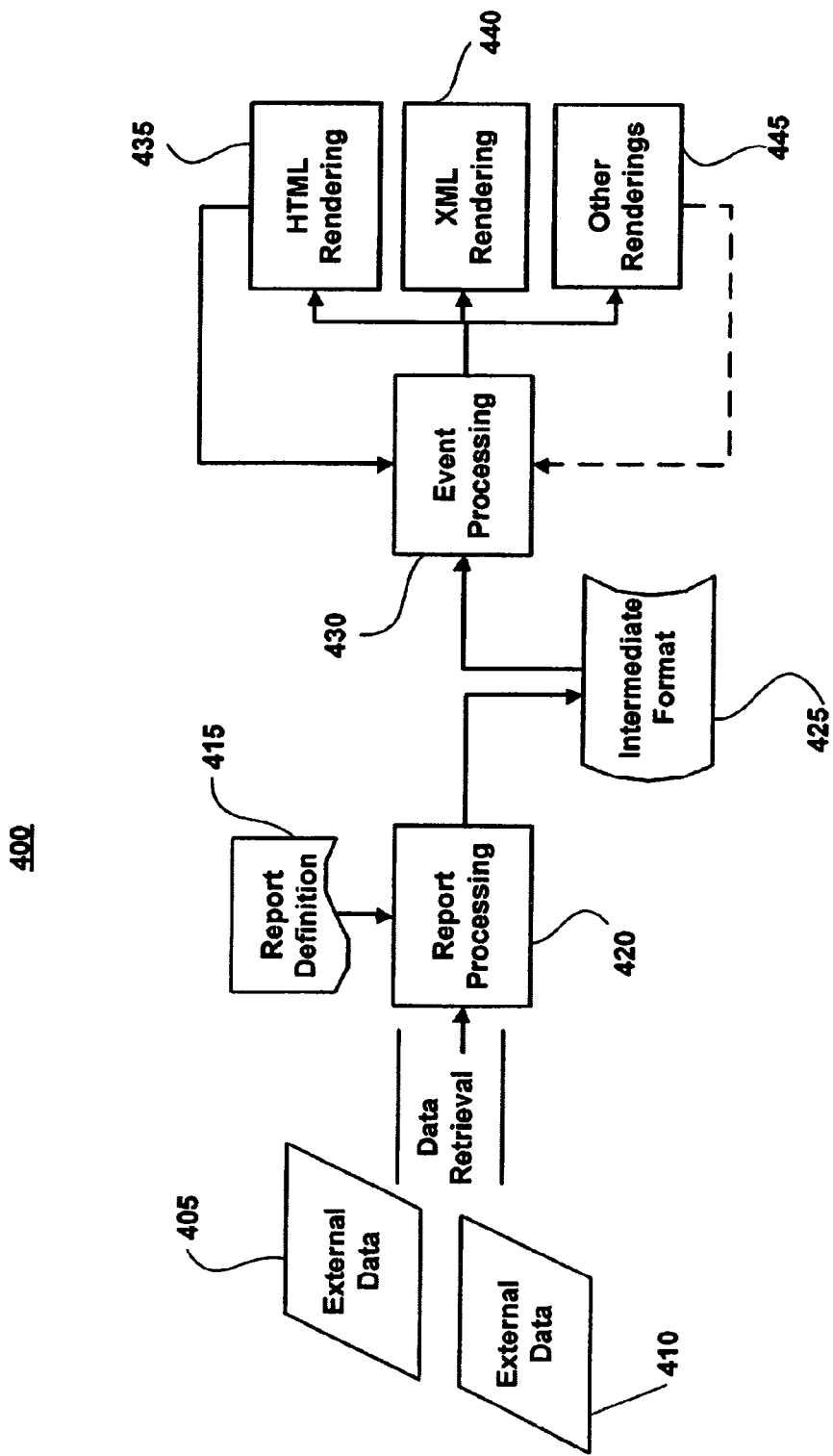
FIG. 4 is a block diagram depicting the flow of report processing in accordance with the herein described systems and methods.

FIG. 4 shows the exemplary data flow between exemplary components of a data work product (e.g. report) generation and management system that expose reports as schematized queryable data sources. As shown, report generation and management system 400 comprises various components for use in exposing reports as schematized queryable data sources. Specifically, report generation and management system 400 comprises report processing module 420. As is shown, report processing module 420 cooperates with report definition 415 and accepts data from external data sources 405 and 410 to generate reports that are stored in an intermediate format 425.

In operation, a generated report may be requested by one or more cooperating environments. In this context, the report, stored in an intermediate data format, is communicated to an event processing module 430 which coordinates the communication of generated reports, in whole or in part, to requesting environments. Event processing module 430 determines the rendering of the requesting environment and provides the report in whole or in part to the requesting environment in a rendering extension native to the requesting environment. For example, if html rendering is required html rendering extensions 435 are employed. Comparatively, if XML rendering is required, XML rendering extension 440 is employed. And so on, such that other rendering types would be represented by other rendering extensions 445.

Figure 5:
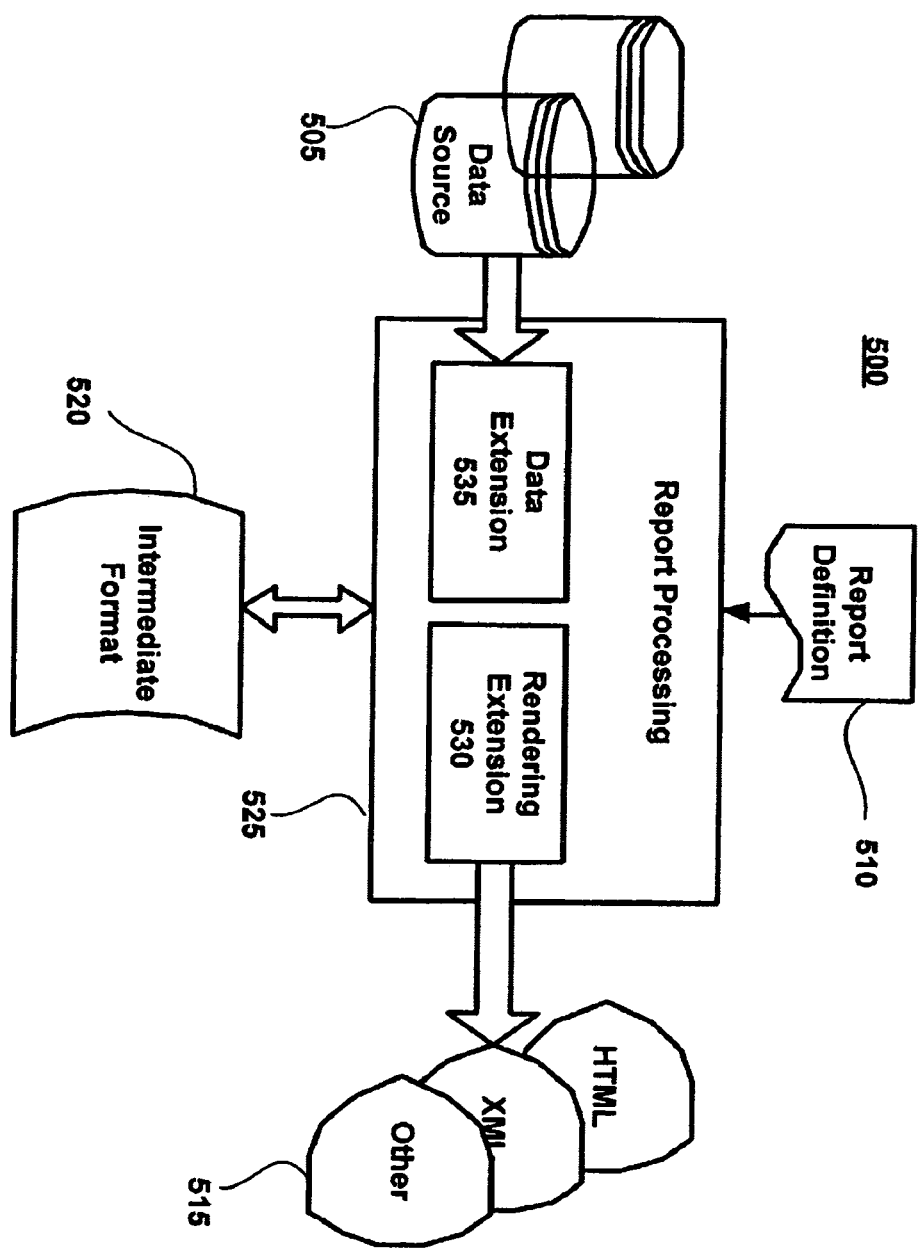
FIG. 5 is a block diagram depicting the flow of report utilization in accordance with the herein described system and methods.

FIG. 5 shows an exemplary high level deployment of an exemplary report generation and management system 500. As shown report generation and management system 500 comprises report processing module 525. Report processing module 525 comprises data extensions 525 and rendering extensions 530. Furthermore, report processing module cooperates with report definition 510 and data source 505. In operation, a request for a report is provided to the report processing module 525. The report processing module 525 obtains the proper report definition from report definitions filed 510 for application to data found in data source 505. The data is then processed by report processing module 525 using data extension 535 to identify the data elements from data source 505. Report processing module 525 then processes the data according to the appropriate report definition to generate a report that is exposed as a schematized queryable data source. The report is then stored by the report processing module 525 in an intermediate data format 520 for future use.

In addition to generating reports, report generation and management system 500 is capable of communicated generated reports to cooperating environments in spite of the rendering required by the required by the requesting environments. For example, report generation and management system 500 may be employed to communicate a generated report to a cooperating environment In this context, the generated report stored in an intermediate format 520 is retrieved by report processing module 525 and processed using rendering extensions 530 to generate a report in a rendering format acceptable by the requesting environment.

Figure 6:
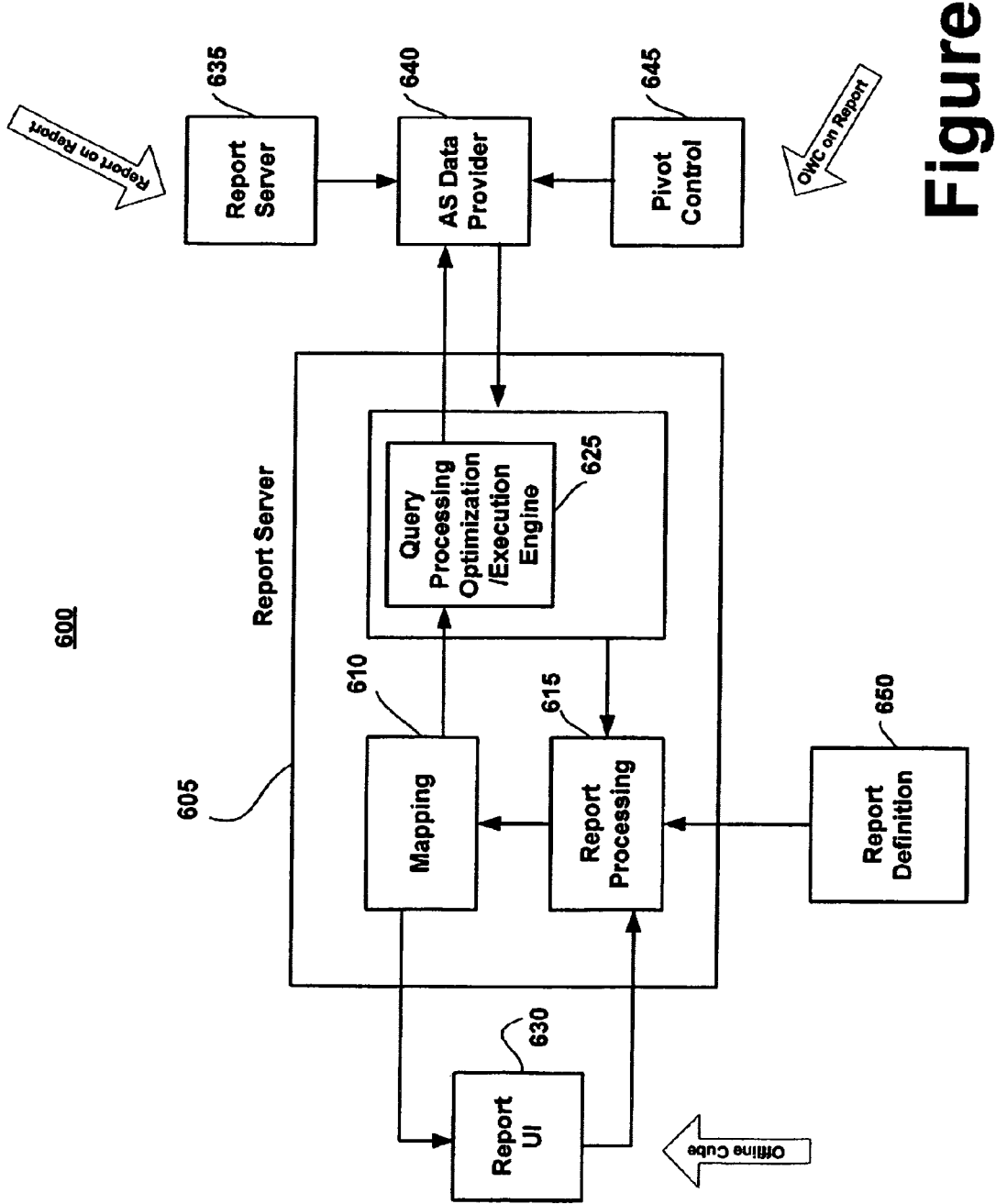
FIG. 6 is a detailed block diagram of exemplary components to process schematized data constructs in accordance with the herein described systems and methods.

FIG. 6 shows a more detailed exemplary deployment of an exemplary report generation and management system capable of exposing a report as a schematized queryable data source having a rendering independent persistent data format. As shown report generation and management system 600 comprises a report server 605. Report server 605 in turn comprises mapping module 610, report processing module 615 and query processing optimization/execution engine 625. Report server 605 cooperates with various cooperating components including but not limited to report user interface (UI) 630, report definitions 650, a second report server 635, Analysis Services (AS) data provider 640, and pivot control component 645.

When generating a report, report server 605 cooperates with report definitions 650 to obtain the appropriate report definition for the desired report. The report definition is then processed by report processing module 615 of report server 605. Report server 605, using the appropriate report definition gathers the appropriate data and generates a schematized queryable data source representative of the desired report. The report can then be displayed on the report UI 630 by report server 605. In this contemplated operation, report processing module 615 of report server 605 cooperates with mapping module 610 to map the desired report for viewing and display on report UI 630.

In operation, report generation and management system 600 may support a number of operations and functions. For example a report be run on a set of already generated reports. As shown in FIG. 6 by the arrow a request for a report on a report is provided to a report server 635. The report server 635 processes the report on a report request and cooperates with AS data provider module to fulfill the request. In turn, AS data provider 640 cooperates with query processing optimization/execution engine 625. This engine cooperates with report processing module 615 to obtain/generate the necessary data to satisfy the report on a report request. Similarly, a request for an OWC on a report may be provided to pivot control module 645 which in turn cooperates with AS data provider 640 to fulfill the OWC on the report request.

Another use of report generation and management system 600 is to allow participating users to view reports on report UI 630 originating from remote cooperating environments. In this context, the report UI 630 cooperates with report processing module 615. Report processing module 615 cooperates with mapping module 610. Mapping module 610 operates to translate data from one data format to another. As such, it may be used to translate data in a rendering independent data format to a rendering dependent data format for rendering in requesting environment. The mapping module 610 then cooperates with the query processing optimization/execution engine 625 for communication to one or more cooperating modules.

It is appreciated that report server 605 in the contemplated implementations can comprise any of computing hardware, computing software, and the combination of computing hardware and computing software.

Figure 7:
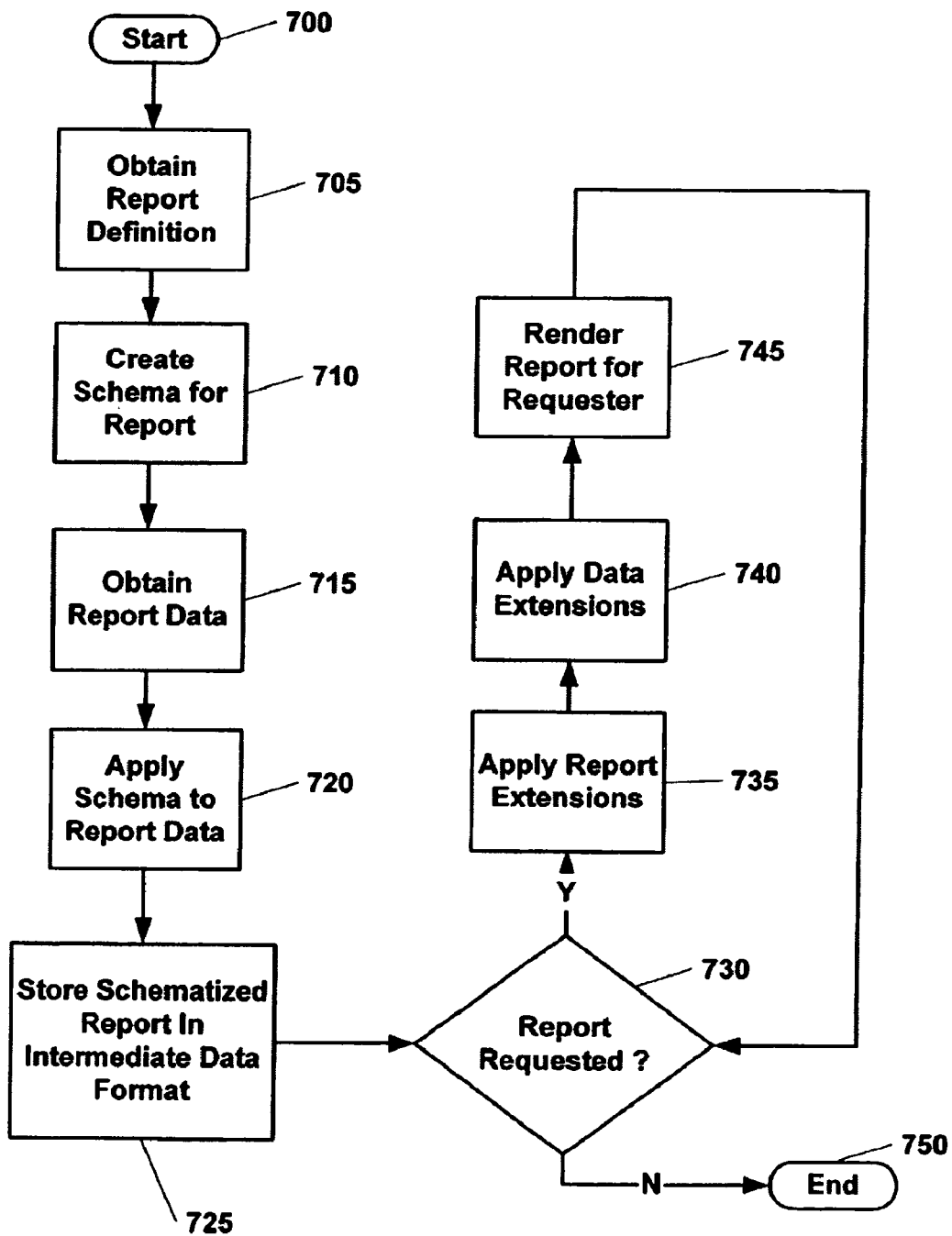
FIG. 7 is flow diagram of the processing performed to expose a report as a schematized queryable data source in accordance with the herein described systems and methods.

FIG. 7 shows a flowchart of exemplary processing performed to expose a report as a schematized queryable data source and the subsequent processing performed in utilizing such exposed report. As shown processing begins at block 700 and proceeds to block 705 where the report definition is obtained. At block 710 a schema is created for the report according the obtained report definition. The report data is then obtained at block 715 and the created schema, created at block 710, is applied to the report data at block 720. The schematized report is then stored in an intermediate format at block 725 (according the to processing described in FIGS. 8A and 8B). From there the processing proceeds to block 730 where a check is performed to determine if a report has been requested (e.g. requested by the native environment or by a cooperating environment). In the context of the examples provided, an environment comprises ay of a computing environment and a partial computing environment. If a report has been requested, processing proceeds to block 735 where data extensions are applied to the report and data extensions provided at block 740. In a contemplated illustrative implementation, the data extensions are applied to the data of the report to assist to identify the definition of the data fields. The rendering extensions, as described above, are used to translate the report for use in the rendering format of the environment using the report. The report is then rendered at block 745 for display in the environment requesting the report. Processing then terminates at block 750. If, however, at block 730 a report is not requested, processing proceeds to block 750 and terminates.

E. Rendering Independent Persistence of Information

Figure 8A:
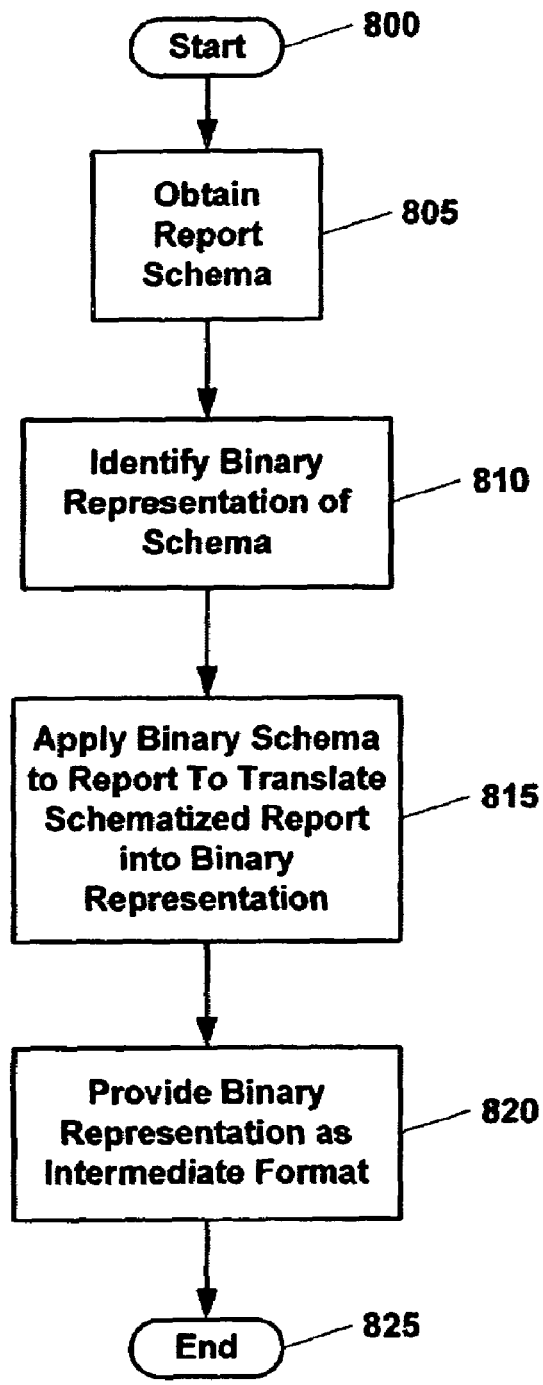
FIG. 8A is a flow diagram of the processing performed to expose the data source as a rendering independent persistence of information.

FIG. 8A shows a flowchart of exemplary processing performed to provide an exposed report in a rendering independent persistent data format. As shown, processing begins at block 800 and proceeds to block 805 where the report schema of the exposed schematized queryable report is obtained. Processing then proceeds to block 810 where the rendering independent persistent data format is identified. In an illustrative implementation, the rendering independent persistent data format comprises a binary data format. In context to block 810, the processing of the herein described methods in accordance with the provided example contemplate the identification of binary representation of the schema. Further to the provided example, processing proceeds to block 815 where the identified binary schema is applied to the desired report to translate the schematized report into a binary data format. Included in the translation step is the execution of a data parsing process that is defined by at least one parsing rule which acts to separate the report data for processing. Processing then proceeds to block 820 where the generated binary representation is provided as an intermediate data format in which the exposed report may exist. Processing then terminates at block 825.

It is appreciated that although the exemplary implementation contemplates the use of a binary representation of the rendering independent persistent data format that the inventive concepts disclosed herein extend beyond the provided illustrative implementations to include but not limited to hexadecimal representation, assembly language representations, and high level programming language representations.

Figure 8B:
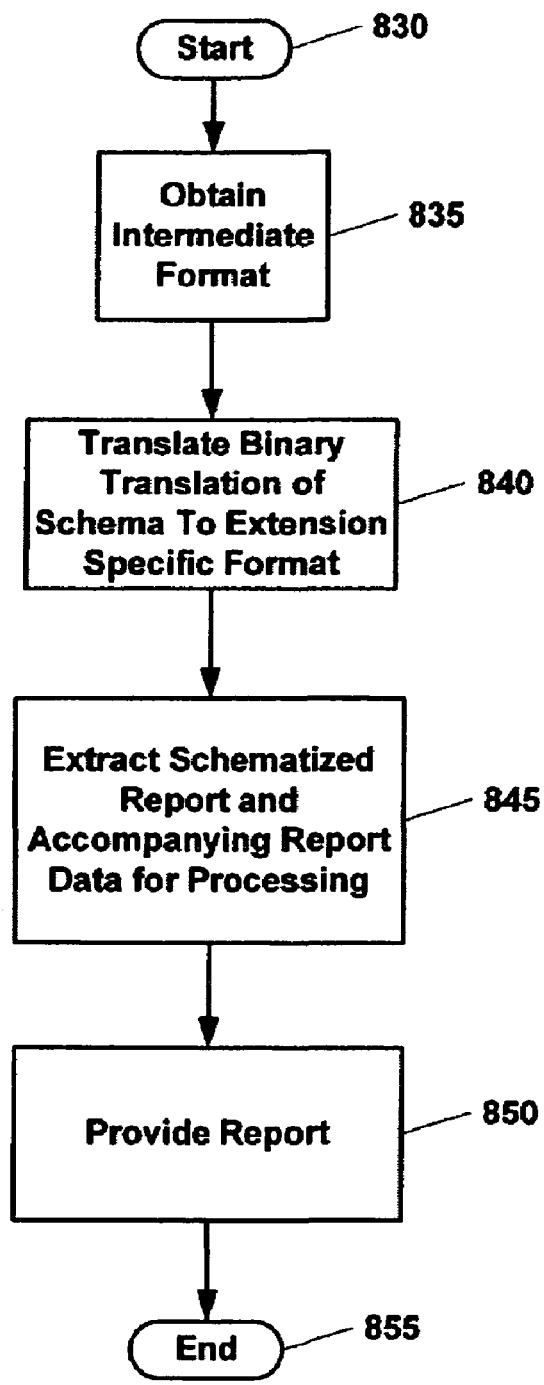
FIG. 8B is a flow diagram of the processing performed when translating the rendering independent persistence of information as a report exposed as a schematized queryable data source.

FIG. 8B shows a flowchart of the exemplary processing performed when processing requests by cooperating environments to retrieve an exposed report, in whole or in part, for use in the requesting environment. As shown, processing begins at block 830 and proceeds to block 835 where the desired report (in whole or in part) is requested and is provided in its intermediate format (e.g. rendering independent persistent data format). From there, processing proceeds to block 840 where the intermediate format, a rendering independent format, to a rendering dependent format, namely, the rendering format of the requesting environment. In an illustrative implementation, the translation step contemplates the binary translation of the report schema to the extension specific format of the requesting environment. At block 845, the schematized report and accompanying data are extracted for presentation in the rendering extension of the requesting environment. The final report is then provided at block 850. Processing then terminates at block 850.

Figure 9:
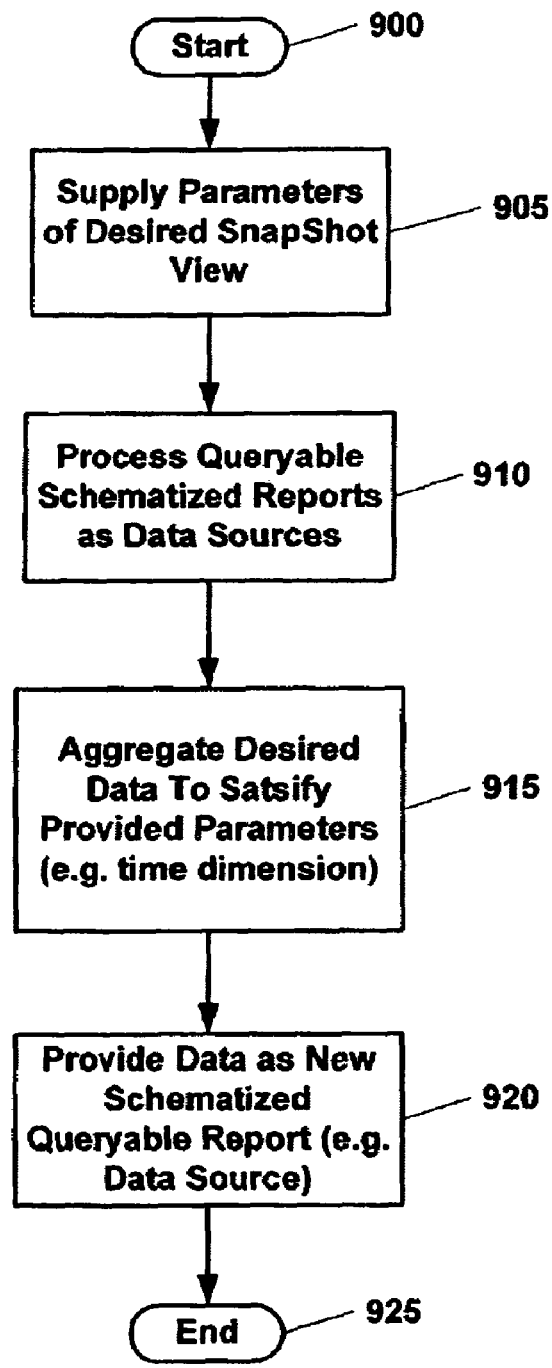
FIG. 9 is a flow diagram of the processing performed when processing data exposed as a schematized queryable data source to generate a desired snapshot.

FIG. 9 shows a flow chart of exemplary processing performed when performing a time-based query is performed against a set of generated reports. As shown, processing begins at block 900 and proceeds to block 905 where the parameters of the desired snapshot view is provided. From there processing proceeds to block 910 where the schematized queryable reports are processed as data sources. At block 915, the data is then aggregated from the set of generated reports according to the provided parameters (e.g. collect all sales values from year 1 to year 2 in the Midwest geographic region across all sales reports from year 1 to year 2). The aggregated data is then collected and processed at block 920 to provide an new schematized queryable report having the desired snapshot data. Processing the proceeds to block 925 where it terminates.

The processing described in FIG. 9 employs one or more features of the herein described systems and methods. Specifically, the herein described systems and methods contemplate a mechanism that exposes a report as a schematized queryable data source having a rendering independent persistent data format. The reports being schematized, queryable, and persistent, a time-based query (e.g. trend snapshot) is easily processed on a set of such reports as data is collected over a time value identified from the report's schema The values are reliable as the report is stored in a persistent data format.

F. CONCLUSION

As mentioned above, while exemplary embodiments of the present invention have been described in connection with various computing devices and network architectures, the underlying concepts may be applied to any computing device or system in which it is desirable to traverse and/or perform other functions in connection with Thus, the processes and systems described above may be applied to a variety of applications and devices. While exemplary data structures, programming languages, names and examples are chosen herein as representative of various choices, these are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the debugging interface aspects of the present invention, e.g., through the use of a data processing API or the like, are preferably implemented in a high level procedural or object-oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the debugging capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the presently preferred embodiments, it is to be understood that other similar embodiments may be used or modifications and additions may be made to the described embodiment for performing the same function of the present invention without deviating there from. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

We claim:

1. A method implemented at least in part by a computing device to provide a rendering independent persistence of information comprising the steps of:

providing a plurality of data sources, each said data source having a predefined data structure and associated with a time, each said predefined data structure comprising a corresponding schema definition;

translating each of the plurality of data sources according to the corresponding schema definition that yields corresponding rendering independent persisted data in a rendering independent persisted data format, wherein the translating step comprises the step of performing a binary translation of said each of the plurality of data sources; and aggregating the rendering independent persisted data from each of the plurality of data sources according to a time-based parameter to generate a new schematized queryable data source having the rendering independent persistent data format and the new schematized queryable data source comprising the aggregated rendering independent persisted data from each of the plurality of data sources according to the time-based parameter to allow a time driven query to be performed on the new schematized queryable data source, wherein the plurality of data sources and the new schematized queryable data source are schematized queryable reports.

2. The method as recited in claim 1, further comprising operating on the rendering independent persistent data format to produce rendering specific data.

3. The method as recited in claim 1, further comprising parsing the data according to some predefined parsing step.

4. A computer readable storage medium having a tangible component with computer readable instructions stored thereon to instruct a computer to perform a method comprising steps of:

providing a plurality of data sources, each said data source having a predefined data structure and associated with a time, each said predefined data structure comprising a corresponding schema definition;

translating each of the plurality of data sources according to the corresponding schema definition that yields corresponding rendering independent persisted data in a rendering independent persisted data format, wherein the translating step comprises the step of performing a binary translation of said each of the plurality of data sources; and aggregating the rendering independent persisted data from each of the plurality of data sources according to a time-based parameter to generate a new schematized queryable data source having the rendering independent persistent data format and the new schematized queryable data source comprising the aggregated rendering independent persisted data from each of the plurality of data sources according to the time-based parameter to allow a time driven query to be performed on the new schematized queryable data source, wherein the plurality of data sources and the new schematized queryable data source are schematized queryable reports.

5. A system for providing a rendering independent persistence of information comprising:

at least one computing processor;

memory communicatively coupled with said at least one computing processor, said memory comprising instructions executable by said at least one computing processor, said instructions comprising:

instructions for providing a plurality of data sources, each said data source having data, wherein the data has an associated data structure and is associated with a time, each said data structure comprising a schema definition;

instructions for providing a processing module, the processing module operating on each of the plurality of the data sources to generate corresponding rendering persisted data in a rendering independent persisted data format, wherein the rendering independent persisted data format operates in various rendering specific environments, wherein the processing module executes according to the corresponding schema definition a binary translation of the data into the rendering independent persisted data format; and instructions for aggregating the rendering independent persisted data from each of the plurality of data sources according to a time-based parameter to generate a new schematized queryable data source having the rendering independent persistent data format and the new schematized queryable data source comprising the aggregated rendering independent persisted data from each of the plurality of data sources according to the time-based parameter to allow a time driven query to be performed on the new schematized queryable data source, wherein the plurality of data sources and the new schematized queryable data source are schematized queryable reports.

6. The system as recited in claim 5, wherein the system comprises a computing environment.

7. The system as recited in claim 5, wherein the data comprises report data.

8. The system as recited in claim 7, wherein the report data comprises a schematized queryable data source.

9. The system as recited in claim 8, wherein the report data is aggregated according to at least one report definition.

10. In a computing environment, a method implemented at least in part by a computing device for providing a rendering independent persisted data format, the method comprising:

receiving a plurality of data sources, each of said data sources associated with a time and comprising a schema definition;

parsing said each of the data sources according to at least one predefined parsing rule;

translating the parsed each of the data sources according to the schema definition into rendering independent persisted data having a rendering independent persisted data format, wherein the translating step comprises binary translating the parsed each of the data sources; and aggregating the rendering independent persisted data from said each of the plurality of data sources according to a time-based parameter to generate a new schematized queryable data source having the rendering independent persistent data format and the new schematized queryable data source comprising the aggregated rendering independent persisted data from said each of the plurality of data sources according to the time-based parameter to allow a time driven query to be performed on the new schematized queryable data source, wherein the plurality of data sources and the new schematized queryable data source are schematized queryable reports.

11. A computer readable storage medium having a tangible component with computer readable instructions stored thereon to instruct a computer to perform a method comprising:

receiving a plurality of data sources, each of said data sources associated with a time and comprising a schema definition;

parsing the each of the data sources according to at least one predefined parsing rule;

translating the parsed each of data sources according to the schema definition into rendering independent persisted data having a rendering independent persisted data format, wherein the translating step comprises binary translating the parsed each of the data sources to an extension specific format of the requesting environment; and aggregating the rendering independent persisted data from the each of the plurality of data sources according to a time-based parameter to generate a new schematized queryable data source having the rendering independent persistent data format and the queryable schematized data source comprising the aggregated rendering independent persisted data from each of the plurality of data sources according to the time-based parameter to allow a time driven query to be performed on the new schematized queryable data source, wherein the plurality of data sources and the new schematized queryable data source are schematized queryable reports.

* * * * *